US012531735B2

(12) United States Patent
Ishikawa

(10) Patent No.: US 12,531,735 B2
(45) Date of Patent: Jan. 20, 2026

(54) INFORMATION PROCESSING APPARATUS, INFORMATION PROCESSING SYSTEM, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Tomohisa Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 481 days.

(21) Appl. No.: 17/970,800

(22) Filed: Oct. 21, 2022

(65) Prior Publication Data

US 2023/0344633 A1    Oct. 26, 2023

(30) Foreign Application Priority Data

Apr. 26, 2022  (JP) ................................ 2022-072604

(51) Int. Cl.
*G06F 21/00* (2013.01)
*H04L 9/32* (2006.01)

(52) U.S. Cl.
CPC ..................................... *H04L 9/32* (2013.01)

(58) Field of Classification Search
CPC ..... H04L 9/32; H04L 63/0428; H04L 63/108; G06F 21/604; G06F 21/608; H04N 1/44; H04N 1/4406
See application file for complete search history.

(56) References Cited

U.S. PATENT DOCUMENTS

| | | | |
|---|---|---|---|
| 9,338,008 B1* | 5/2016 | Kirkland | H04L 63/0442 |
| 11,403,053 B2* | 8/2022 | Fujii | G06F 3/1204 |
| 2002/0194473 A1* | 12/2002 | Pope | G06F 21/31 |
| | | | 713/168 |
| 2020/0099822 A1* | 3/2020 | Ichimura | H04N 1/4433 |
| 2020/0314150 A1* | 10/2020 | Hayashi | H04L 67/146 |

FOREIGN PATENT DOCUMENTS

| | | |
|---|---|---|
| JP | 2017-138883 A | 8/2017 |
| JP | 2017-182122 A | 10/2017 |
| JP | 2021-145181 A | 9/2021 |

* cited by examiner

*Primary Examiner* — Kendall Dolly
(74) *Attorney, Agent, or Firm* — Oliff PLC

(57) ABSTRACT

An information processing apparatus includes a processor configured to: receive, from a terminal, an instruction to output processing-target data to the terminal, the terminal being not managed by a manager who manages an authentication system to which the information processing apparatus belongs; and, in response to reception of the instruction via a management apparatus managed by the manager, output the processing-target data having no limitation, and, in response to reception of the instruction not via the management apparatus, output the processing-target data having limitation.

10 Claims, 8 Drawing Sheets

| PROCESSING-TARGET-DATA ATTRIBUTE | PATH ATTRIBUTE | TRANSMISSION DATE AND TIME |
|---|---|---|
| PROCESSING-TARGET DATA A | NONE | 2022/3/4 13:40 |
| | VIA MANAGEMENT APPARATUS | 2021/2/9 12:40 |
| PROCESSING-TARGET DATA B | NONE | 2021/12/4 18:55 |
| ⁎ | ⁎ | ⁎ |
| ⁎ | ⁎ | ⁎ |
| ⁎ | ⁎ | ⁎ |

Select processing-target data, for which an output instruction is to be transmitted to the information processing apparatus, from the list of pieces of information indicating processing-target data.

In addition, select whether the output instruction is to be transmitted to the information processing apparatus via or not via the management apparatus.

| Processing-target data |
|---|
| Processing-target data A |
| Processing-target data B |
| ... |

26A Transmit output instruction via management apparatus

26B Transmit output instruction not via management apparatus

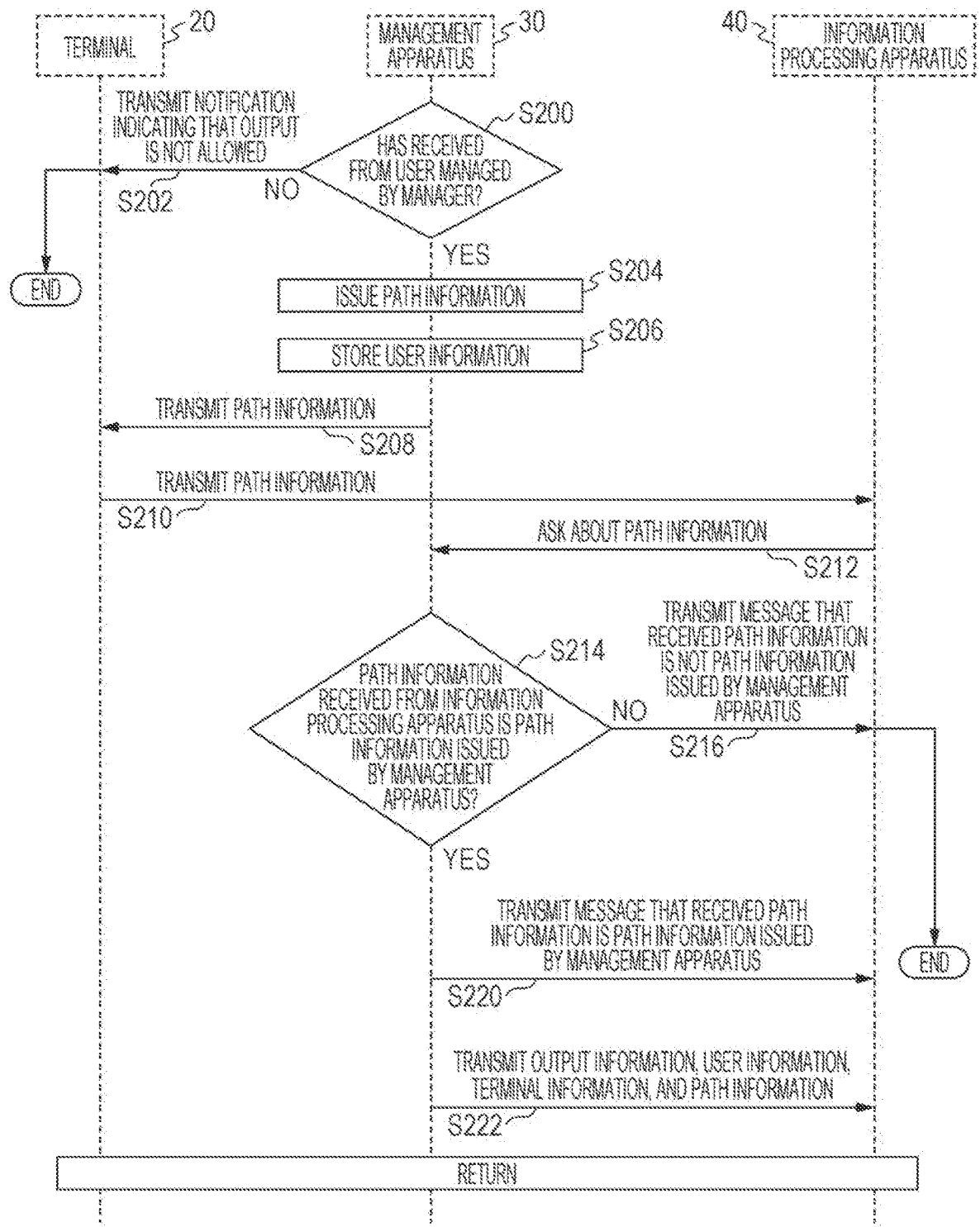

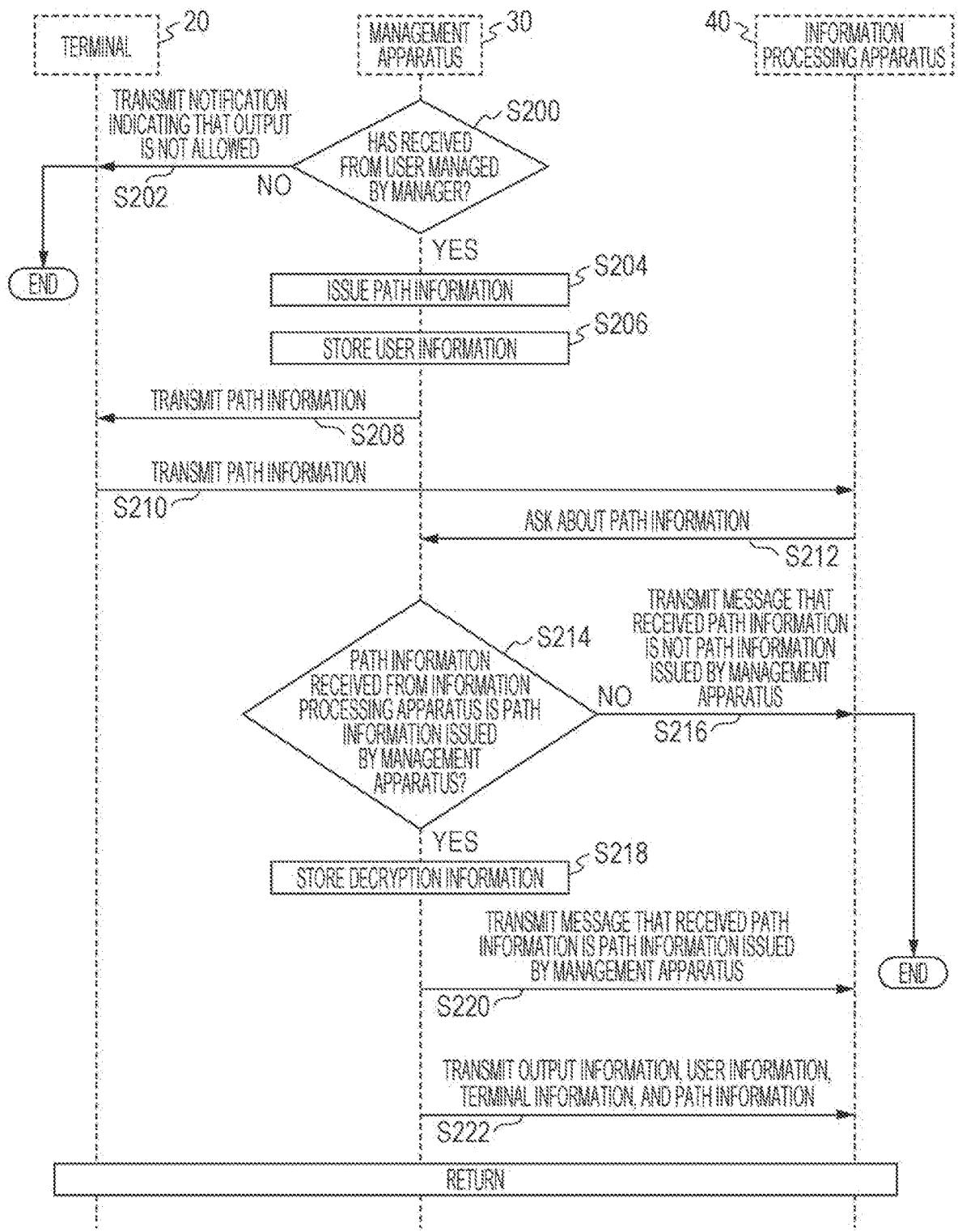

INFORMATION PROCESSING APPARATUS, INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-072604 filed Apr. 26, 2022.

BACKGROUND

(i) Technical Field

The present disclosure relates to an information processing apparatus, an information processing system, a non-transitory computer readable medium, and an information processing method.

(ii) Related Art

Japanese Unexamined Patent Application Publication No. 2021-145181 discloses a scanner. The scanner includes a management unit which manages predetermined account information registered in a policy server shared by multiple users, and a receiving unit which receives identification information which may be read from a portable device owned by a user. The scanner includes an access unit which accesses the policy server by using the predetermined account information, a registering unit which registers a policy in the policy server on the basis of the received identification information, and a controller which controls storage of an encrypted file including image data obtained through scanning. In the scanner, the encrypted file is associated with a security setting in conformity with the policy based on the identification information. At least some of the operations on the file may be restricted according to the security setting in conformity with the policy.

Japanese Unexamined Patent Application Publication No. 2017-138883 discloses an apparatus managed according to security policies under a networked environment. The apparatus includes a policy setting unit which sets an operation setting, which corresponds to a function of installed software, and access control information for controlling whether to allow a user to change the operation setting, according to policy data including the content of a security policy and information indicating whether or not to apply the security policy. The apparatus includes an updating unit which updates the software. The updating unit further includes a determination unit. When an update involves addition of an operation setting influenced by a security policy, the determination unit determines whether there is a contradiction between the information indicating whether or not to apply the security policy and the access control information related to the added operation setting. When the determination unit determines that there is a contradiction, the updating unit causes the policy setting unit to make a setting so that the information indicating whether or not to apply the security policy is consistent with the access control information related to the added operation setting.

Japanese Unexamined Patent Application Publication No. 2017-182122 discloses a data providing system which provides data related to a document stored in a storage unit. The data providing system includes an analyzing unit. If access rights have not been set to data when a user requests the data, the analyzing unit analyzes the content or attributes of the document related to the data. The data providing system includes a setting unit which sets access rights of the data on the basis of the content or attributes obtained through analysis performed by the analyzing unit. The data providing system includes a providing unit. After the user requests the data, when the setting unit sets access rights, the providing unit provides, to the user, the data in accordance with the access rights.

An information processing apparatus may receive instructions to output pieces of processing-target data to a terminal which is not managed by a manager who manages an authentication system to which the information processing apparatus belongs, from the terminal. In this case, the information processing apparatus has an issue in which all the pieces of processing-target data are output in the same way regardless of the reception paths of the instructions.

SUMMARY

Aspects of non-limiting embodiments of the present disclosure relate to an information processing apparatus, an information processing system, a non-transitory computer readable medium, and an information processing method which enable processing-target data to be output in a way in accordance with the reception path of an instruction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising: a processor configured to: receive, from a terminal, an instruction to output processing-target data to the terminal, the terminal being not managed by a manager who manages an authentication system to which the information processing apparatus belongs; and, in response to reception of the instruction via a management apparatus managed by the manager, output the processing-target data having no limitation, and, in response to reception of the instruction not via the management apparatus, output the processing-target data having limitation.

BRIEF DESCRIPTION OF THE DRAWINGS

Exemplary embodiments of the present disclosure will be described in detail based on the following figures, wherein:

FIG. 7 is a schematic diagram illustrating an exemplary list screen according to an exemplary embodiment;

FIG. 8 is a sequence chart of an exemplary path-information issuing process in an information processing system according to the first exemplary embodiment;

FIG. 10 is a sequence chart of an exemplary path-information issuing process in an information processing system according to the second exemplary embodiment.

DETAILED DESCRIPTION

First Exemplary Embodiment

Figure 1:
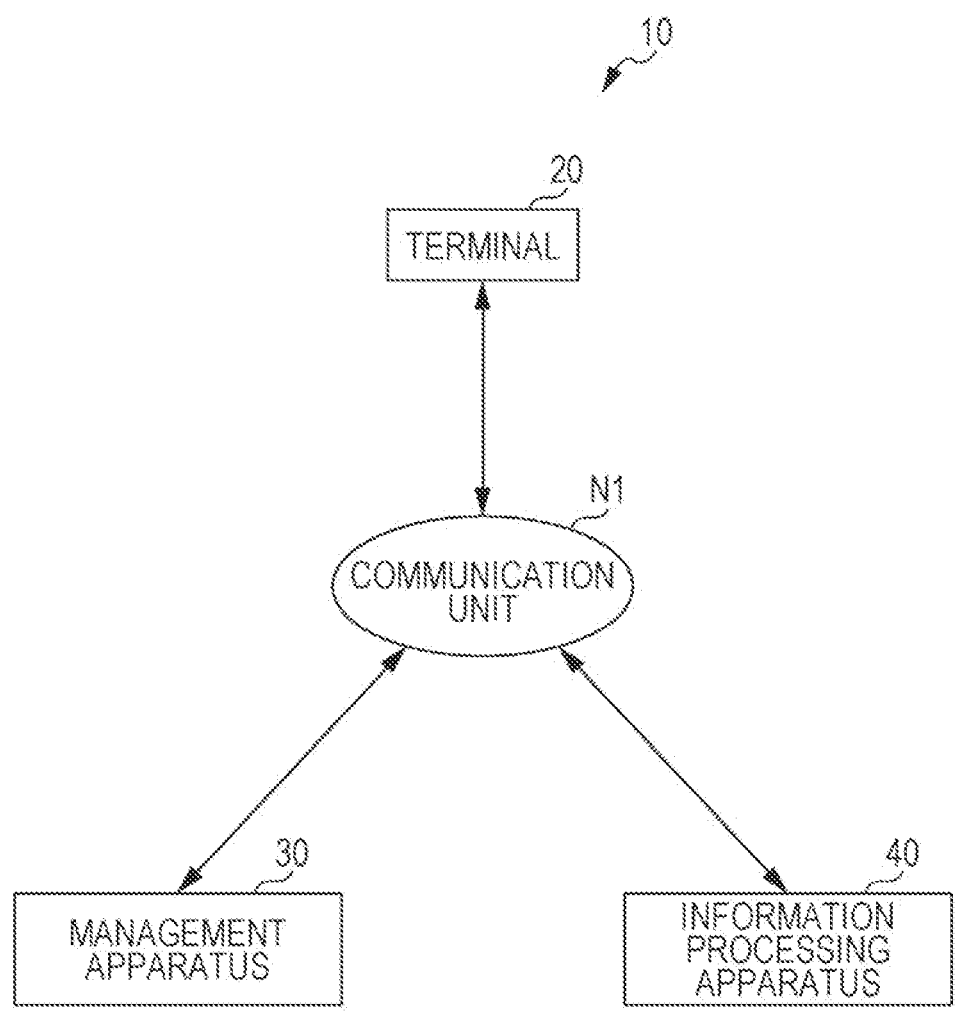
FIG. 1 is a schematic diagram illustrating an exemplary hardware configuration of an information processing system according to an exemplary embodiment.

Exemplary embodiment of the present disclosure will be described below by referring to the drawings. In the drawings, the same reference numerals are given to the same or equivalent components and parts. The dimensional ratios in the drawings are exaggerated for illustrative purposes, and may be different from their actual ratios.

As illustrated in FIG. 1, an information processing system 10 according to a first exemplary embodiment includes a terminal 20, a management apparatus 30, and an information processing apparatus 40. The number of terminals 20 and that of management apparatuses 30 are not limited to those illustrated in FIG. 1.

The terminal 20, the management apparatus 30, and the information processing apparatus 40 are capable of communicating with each other through a communication unit N1. The first exemplary embodiment employs a public communication line, such as the Internet or a telephone line, as the communication unit N1. However, the configuration is not limited to this example. For example, an in-house communication line, such as a local area network (LAN) or a wide area network (WAN), may be used as the communication unit N1. Alternatively, a combination of an in-house communication line and a public communication line may be used. The first exemplary embodiment employs a wireless communication line as the communication unit N1. Alternatively, a wired communication line may be used as the communication unit N1, or a combination of wireless and wired communication lines may be used.

The terminal 20 is not managed by a manager who manages an authentication system to which the information processing apparatus 40 belongs (hereinafter simply referred to as a "manager"), and is used by a user who is managed by the manager (hereinafter simply referred to as a "user"). The first exemplary embodiment employs, as the terminal 20, for example, an image forming apparatus that is not managed in an in-house network operated in the authentication system to which the manager belongs and that is disposed in the user's house which is outside the in-house network. However, the configuration is not limited to this example. Any apparatus may be used as long as the terminal transmits an instruction to output processing-target data to the terminal 20 (hereinafter simply referred to as an "output instruction"), to the management apparatus 30 or the information processing apparatus 40 and the terminal receives processing-target data. The processing-target data will be described below. For example, a personal computer, a tablet terminal, or a smartphone, which is used by the user but which is not managed by the manager, may be used as the terminal 20.

Figures 2, 3:
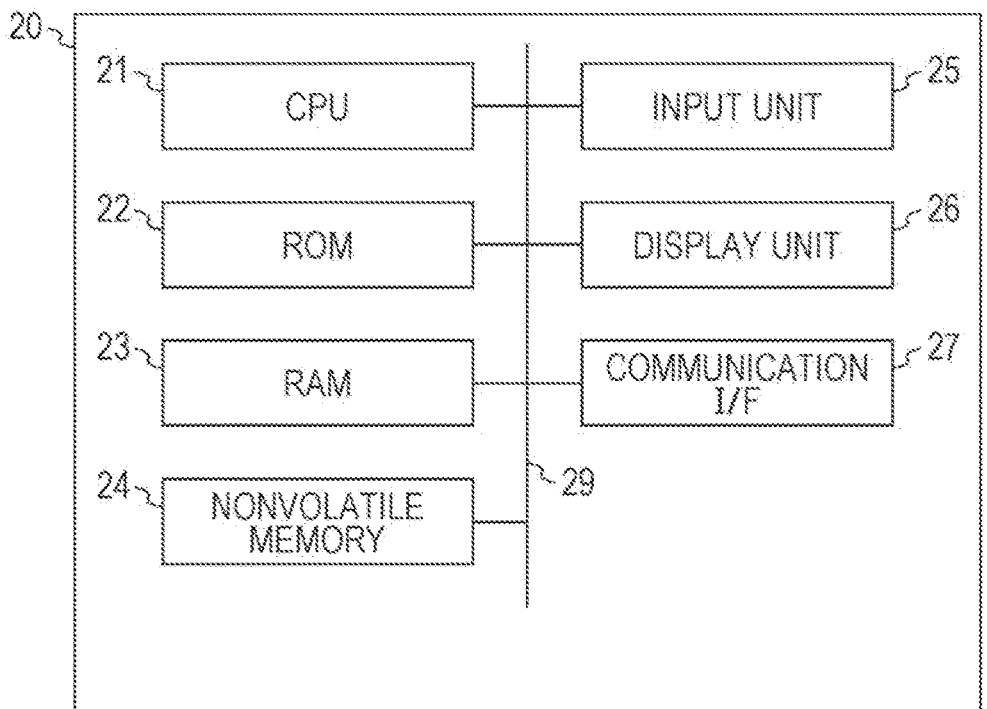
FIG. 2 is a block diagram illustrating an exemplary hardware configuration of a terminal according to an exemplary embodiment.
FIG. 3 is a schematic diagram illustrating an exemplary configuration of a terminal database according to an exemplary embodiment.

As illustrated in FIG. 2, the terminal 20 includes the configurations of a central processing unit (CPU) 21, a read only memory (ROM) 22, a random access memory (RAM) 23, a nonvolatile memory 24, an input unit 25, a display unit 26, and a communication Interface (I/F) 27. The configurations are connected to each other communicatively through a bus 29.

The CPU 21, which is a central processing unit, runs various programs and controls the units. That is, the CPU 21 reads programs from the ROM 22 or the nonvolatile memory 24, and runs the programs by using the RAM 23 as a work area. According to the programs stored in the ROM 22, the CPU 21 controls the configurations and performs various computation processes. The nonvolatile memory 24 is an exemplary storage device in which stored information is maintained even when supplied power is interrupted. For example, a semiconductor memory such as a solid state drive (SSD) or a hard disk may be used. In the first exemplary embodiment, the nonvolatile memory 24 stores a terminal program 22A.

The nonvolatile memory 24 stores various programs and various data. The RAM 23 is used as a work area, and temporarily stores programs or data.

The nonvolatile memory 24 stores a terminal database 22B. As illustrated in FIG. 3, the terminal database 22B stores the processing-target-data attribute, the path attribute, and the transmission date and time in association with each other.

The processing-target-data attribute is a string for specifying processing-target data. In the first exemplary embodiment, the processing-target-data attribute is expressed as a uniform resource locator (URL). Specifically, the processing-target-data attribute is a string in which the processing-target data identification (ID) for identifying processing-target data, such as the name of processing-target data, is combined with the URL of the information processing apparatus 40 which holds the processing-target data or the URL indicating the storage location of the processing-target data in the information processing apparatus 40. However, the configuration is not limited to this example. Only a processing-target data ID may be used as the processing-target-data attribute.

The path attribute is information indicating whether the terminal 20 transmitted, via or not via the management apparatus 30, an output instruction for the processing-target data specified by the processing-target-data attribute stored in association with the path attribute. Specifically, "via management apparatus" is stored for the case where the terminal 20 transmitted an output instruction via the management apparatus 30 to the information processing apparatus 40. In contrast, "none" is stored for the case where the terminal 20 transmitted an output instruction to the information processing apparatus 40 not via the management apparatus 30.

The transmission date and time indicates a date and time when the terminal 20 transmitted, to the management apparatus 30 or the information processing apparatus 40, an output instruction for the processing-target data specified by the processing-target-data attribute stored in association with the transmission date and time. In other words, the transmission date and time indicates a date and time when the management apparatus 30 or the information processing apparatus 40 received, from the terminal 20, an output instruction for the processing-target data specified by the processing-target-data attribute stored in association with the transmission date and time.

For example, the example in FIG. 3 indicates that the terminal 20 transmitted an output instruction for the processing-target data specified by the processing-target-data attribute of processing-target data A, via the management apparatus 30 to the information processing apparatus 40 at 12:40 on Feb. 9, 2021.

The nonvolatile memory 24 stores user information for identifying the user who uses the terminal 20. In the first exemplary embodiment, an ID defined by the manager to identify the user is used as the user information. The ID is an account with which the user is identified in the authentication system in the network in which the information processing apparatus 40 is managed. However, the configuration is not limited to this example. For example, if the user is an employee, the user's employee number may be used as the user information. If the user is a student, the user's student ID number may be used as the user information. Alternatively, for example, a mail address or a telephone number of the terminal 20 may be used as the user information.

The nonvolatile memory 24 stores terminal information for identifying the terminal 20. The first exemplary embodiment employs the media access control address (MAC address) of the terminal 20 as the terminal information. However, the configuration is not limited to this example. For example, the number given by the manufacturer of the terminal 20 to identify the terminal 20, or the number stored in an application program, which has been installed in the terminal 20, to identify the terminal 20 may be used as the terminal information.

The nonvolatile memory 24 stores a start-of-use date and time which is a date and time when use of the terminal 20 has started.

The input unit 25, which includes a pointing device such as a mouse and a keyboard, is used to perform various input operations.

The display unit 26, which is, for example, a liquid-crystal display, displays various types of information. The display unit 26 may employ a touch panel system, and may function as the input unit 25.

The communication I/F 27 is an interface for communicating with other apparatuses, such as the management apparatus 30 and the information processing apparatus 40, and, for example, uses standards, such as Ethernet™, FDDI, and Wi-Fi™.

The management apparatus 30 is managed by the manager. The first exemplary embodiment employs a server as the management apparatus 30. However, the configuration is not limited to this example. Any apparatus may be used as the management apparatus 30 as long as the apparatus is capable of receiving an output instruction from the terminal 20 and transmitting an output instruction to the information processing apparatus 40. For example, a personal computer which is managed by the manager may be used as the management apparatus 30.

Figure 4:
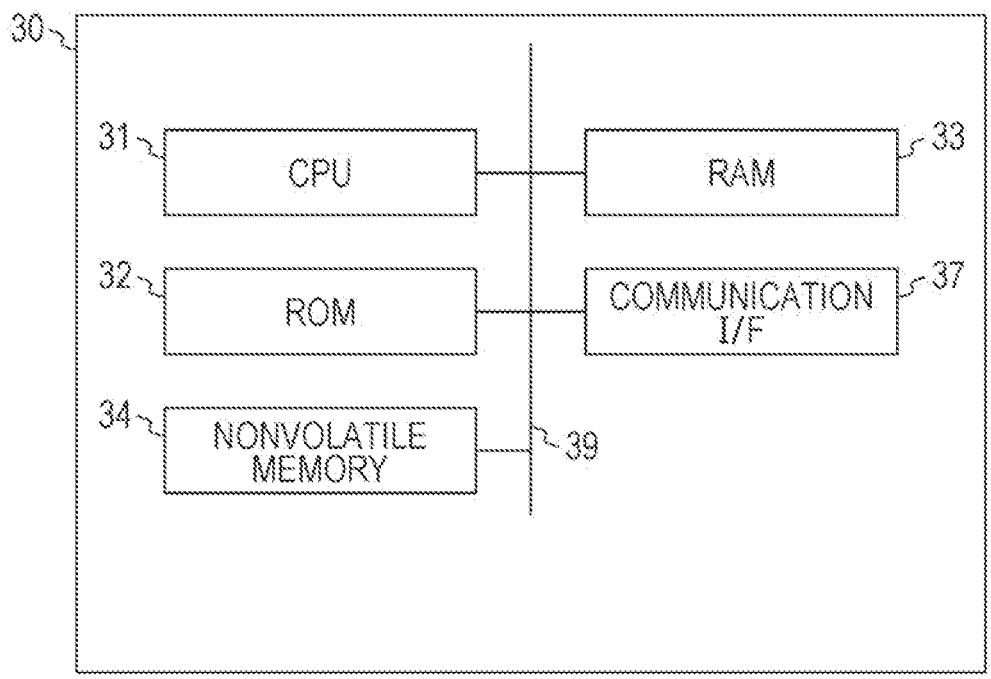
FIG. 4 is a block diagram illustrating an exemplary hardware configuration of a management apparatus according to an exemplary embodiment.

As illustrated in FIG. 4, the management apparatus 30 includes the configurations of a CPU 31, a ROM 32, a RAM 33, a nonvolatile memory 34, and a communication I/F 37. The configurations are connected to each other communicatively through a bus 39. The functions of the CPU 31, the ROM 32, the RAM 33, the nonvolatile memory 34, and the communication I/F 37 are the same as those of the CPU 21, the ROM 22, the RAM 23, the nonvolatile memory 24, and the communication I/F 27 included in the terminal 20.

The nonvolatile memory 34 stores a management program 32A. The CPU 31 reads the program from the nonvolatile memory 34, and runs the program by using the RAM 33 as a work area.

The nonvolatile memory 34 stores a manager database 32B in which user information of all the users who are managed by the manager is stored.

The nonvolatile memory 34 stores management apparatus information for identifying the management apparatus 30. The first exemplary embodiment employs the URL of the management apparatus 30 as the management apparatus information. However, the configuration is not limited to this example. For example, the product name of the management apparatus 30 or the name of the company which operates the management apparatus 30 may be used.

The information processing apparatus 40 has functions of holding processing-target data and outputting processing-target data in response to output instructions from other apparatuses. The first exemplary embodiment employs a server as the information processing apparatus 40. However, the configuration is not limited to this example. Any apparatus may be used as the information processing apparatus 40 as long as the apparatus is capable of receiving an output instruction from the terminal 20 or the management apparatus 30 and outputting the processing-target data associated with the output instruction. For example, a personal computer may be used as the information processing apparatus 40.

Figure 5:
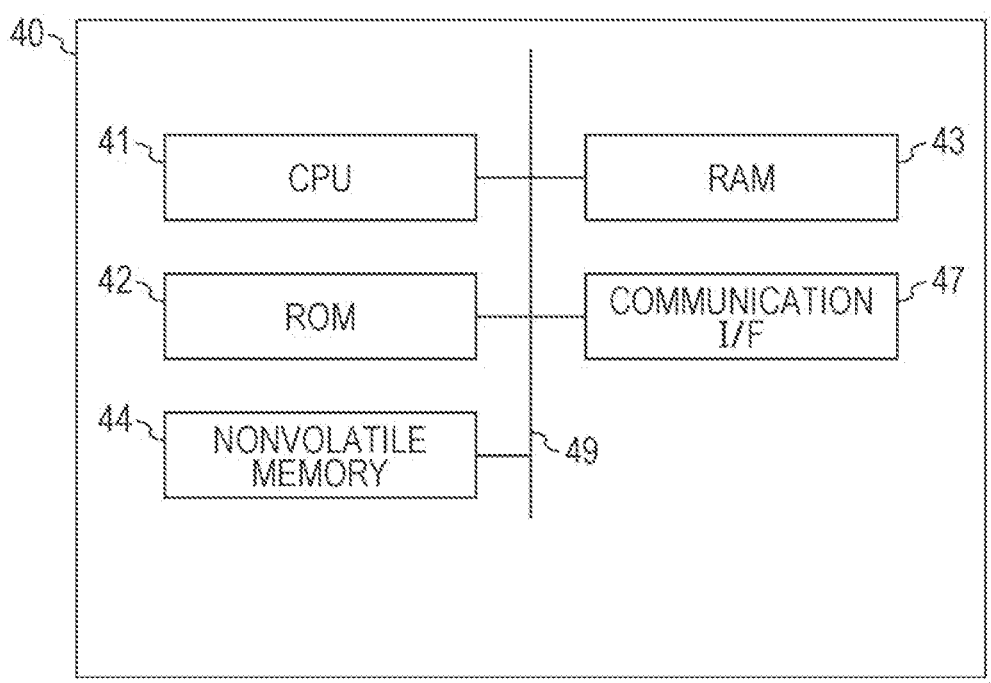
FIG. 5 is a block diagram illustrating an exemplary hardware configuration of an information processing apparatus according to an exemplary embodiment.

As illustrated in FIG. 5, the information processing apparatus 40 includes the configurations of a CPU 41, a ROM 42, a RAM 43, a nonvolatile memory 44, and a communication I/F 47. The configurations are connected to each other communicatively through a bus 49. The functions of the CPU 41, the ROM 42, the RAM 43, the nonvolatile memory 44, and the communication I/F 47 are the same as those of the CPU 21, the ROM 22, the RAM 23, the nonvolatile memory 24, and the communication I/F 27 included in the terminal 20.

The nonvolatile memory 44 stores an information processing program. The CPU 41 reads the program from the nonvolatile memory 44 and runs the program by using the RAM 43 as a work area.

The nonvolatile memory 44 stores processing-target data. The first exemplary embodiment employs document information, which is printed by the terminal 20, as the processing-target data. However, the configuration is not limited to this example. For example, if the terminal 20 is a smartphone, for example, movie information, which is played back by the terminal 20, or image information, which is displayed on the terminal 20, may be used as the processing-target data. In the first exemplary embodiment, confidential information, which is preset by the manager as information which is not to be known to anyone other than the user, is included in the processing-target data. For example, the confidential information is character information which is preset by the manager.

Figure 6:
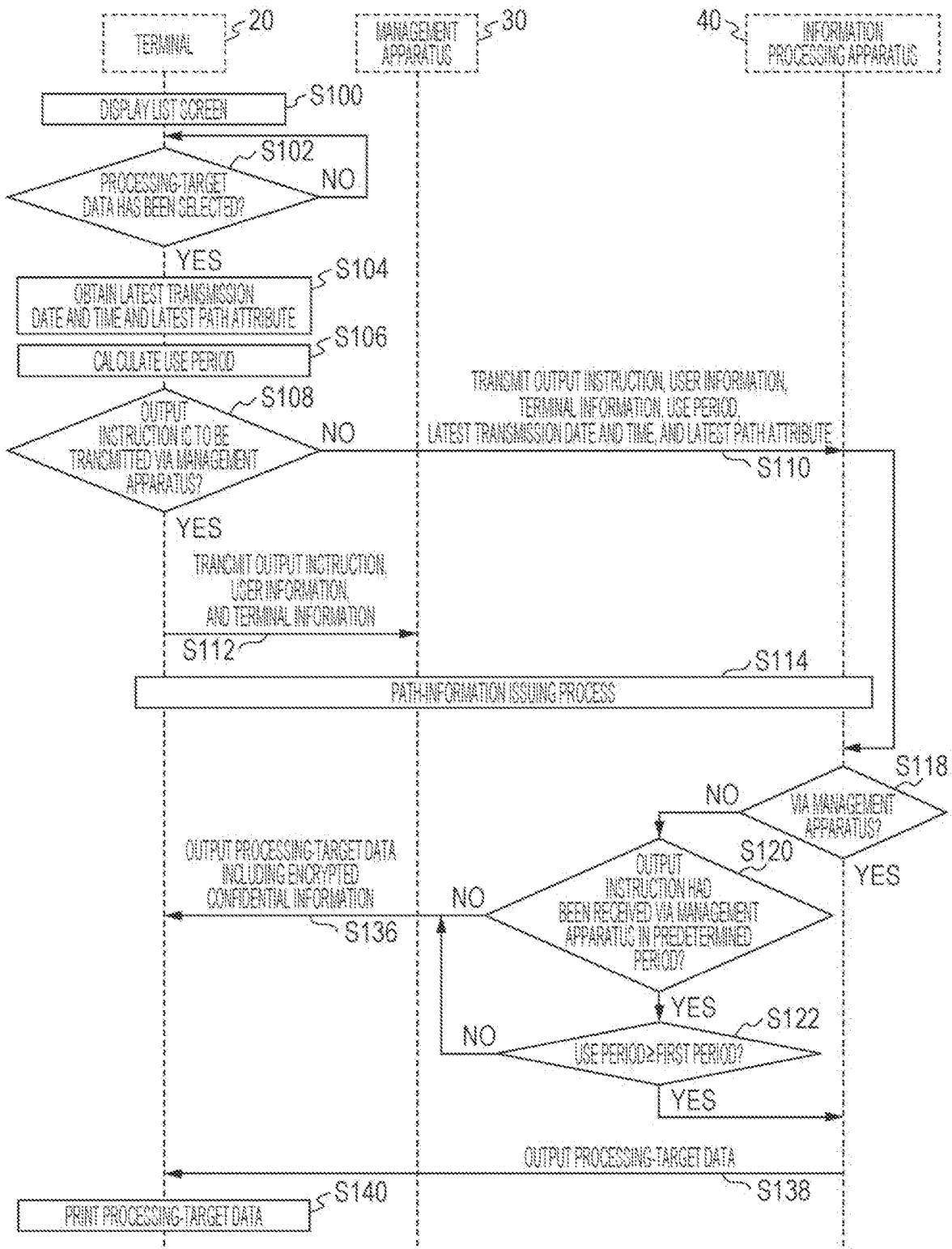
FIG. 6 is a sequence chart of an exemplary information process in an information processing system according to a first exemplary embodiment.

Referring to FIGS. 6 to 8, the flow of an information process in the information processing system 10 according to the first exemplary embodiment will be described.

The processes performed by the terminal 20 are performed by the CPU 21 reading the terminal program 22A from the nonvolatile memory 24 and loading the terminal program 22A on the RAM 23 for execution. The processes performed by the management apparatus 30 are performed by the CPU 31 reading the management program 32A from the nonvolatile memory 34 and loading the management program 32A on the RAM 33 for execution. The processes performed by the information processing apparatus 40 are performed by the CPU 41 reading the information processing program from the nonvolatile memory 44 and loading the information processing program on the RAM 43 for execution.

In step S100 in FIG. 6, the CPU 21 of the terminal 20 displays a list screen according to a predetermined format on the display unit 26.

As illustrated in FIG. 7, a list of pieces of information indicating processing-target data, and a message for prompting selection of processing-target data, for which an output instruction is to be transmitted to the information processing apparatus 40, from the list are displayed on the list screen according to the first exemplary embodiment. A message for prompting selection of whether an output instruction is to be transmitted to the information processing apparatus 40 via or not via the management apparatus 30 is displayed on the list screen according to the first exemplary embodiment. The CPU 21 of the terminal 20 requests the information processing apparatus 40 for a list of pieces of processing-target data in advance; the information processing apparatus 40 extracts processing-target data which the user who has transmitted the request is allowed to process; the CPU 21 of the terminal 20 receives the extracted information from the information processing apparatus 40. When the list screen is displayed on the display unit 26, the user selects processing-target data that is to be processed by the terminal 20, from the list by using the input unit 25. When the user is to transmit an output instruction via the management apparatus 30 to the information processing apparatus 40, the user selects a button 26A, on which "Transmit an output instruction via the management apparatus" is displayed, by using the input unit 25. In contrast, when the user is to transmit an output instruction to the information processing apparatus 40 not via the management apparatus 30, the user selects a button 26B, on which "Transmit an output instruction not via the management apparatus" is displayed, by using the input unit 25.

In step S102, the CPU 21 waits until any piece of processing-target data and whether an output instruction is to be transmitted via or not via the management apparatus 30 are selected on the list screen by using the input unit 25. If any piece of processing-target data and whether an output instruction is to be transmitted via or not via the management apparatus 30 are selected on the list screen by using the input unit 25 (YES in step 102), the CPU 21 proceeds to step S104.

In step S104, the CPU 21 obtains the latest transmission date and time and the latest path attribute from the terminal database 22B. Specifically, the CPU 21 obtains, as the latest transmission date and time, a transmission date and time closest to the execution date and time of step S104, among the transmission dates and times associated with the processing-target-data attribute specified by the processing-target data selected on the list screen, from the terminal database 22B. The CPU 21 obtains, as the latest path attribute, a path attribute associated with the latest transmission date and time from the terminal database 22B.

In step S106, the CPU 21 calculates the use period of the terminal 20. Specifically, the CPU 21 obtains the start-of-use date and time from the nonvolatile memory 24, and calculates the difference between the execution date and time of step S106 and the start-of-use date and time to calculate the use period of the terminal 20.

In step S108, the CPU 21 determines whether transmission of the output instruction to the information processing apparatus 40 via or not via the management apparatus 30 is selected on the list screen. If transmission of the output instruction to the information processing apparatus 40 via the management apparatus 30 is selected on the list screen (YES in step 108), the CPU 21 proceeds to step S112. In contrast, if transmission of the output instruction to the information processing apparatus 40 not via the management apparatus 30 is selected on the list screen (NO in step 108), the CPU 21 proceeds to step S110.

In step S110, the CPU 21 transmits, to the information processing apparatus 40, the output instruction, the user information, the terminal information, the use period, the latest transmission date and time, and the latest path attribute. Specifically, the CPU 21 transmits, to the information processing apparatus 40, the instruction to output, to the terminal 20, the processing-target data selected on the list screen, the user information, the terminal information, the use period, the latest transmission date and time, and the latest path attribute. The CPU 41 of the information processing apparatus 40, which receives the output instruction, the user information, the terminal information, the use period, the latest transmission date and time, and the latest path attribute from the CPU 21, proceeds to step S118.

If the CPU 21 fails to obtain the latest transmission date and time and the latest path attribute in step S104, the latest transmission date and time and the latest path attribute are not transmitted to the information processing apparatus 40 in step S110. If the CPU 21 fails to calculate the use period in step S106, the use period is not transmitted to the information processing apparatus 40 in step S110. In this case, even if the CPU 41 of the information processing apparatus 40 does not receive these pieces of information, the CPU 41 proceeds to step S118.

In step S112, the CPU 21 transmits the output instruction, the user information, and the terminal information to the management apparatus 30. Specifically, the CPU 21 transmits, to the management apparatus 30, the instruction to output, to the terminal 20, the processing-target data selected on the list screen, the user information, and the terminal information.

In step S114, the CPU 21 of the terminal 20, the CPU 31 of the management apparatus 30, and the CPU 41 of the information processing apparatus 40 perform a path-information issuing process. The details of the path-information issuing process will be described below by using FIG. 8. The CPU 41 of the information processing apparatus 40 proceeds to step S118 after execution of the path-information issuing process.

In step S118, the CPU 41 determines whether the output instruction has been received via the management apparatus 30. Specifically, the CPU 41 determines whether path information which has been issued in the path-information issuing process has been received along with the output instruction. If the CPU 41 has received the output instruction via the management apparatus 30 (YES in step 118), the CPU 41 proceeds to step S138. In contrast, if the CPU 41 has received the output instruction not via the management apparatus 30 (NO in step 118), the CPU 41 proceeds to step S120.

In step S120, the CPU 41 determines whether an output instruction had been received via the management apparatus 30 in a predetermined period from the same terminal as the terminal 20 which has transmitted the output instruction in step S110. Specifically, the CPU 41 determines whether the following conditions are satisfied: the latest transmission date and time received from the terminal 20 in step S110 is within a predetermined period (for example, 30 days) from the execution date and time of step S120; the latest path attribute indicates transmission via the management apparatus 30. If the CPU 41 had received an output instruction via the management apparatus 30 in the predetermined period from the same terminal 20 (YES in step 120), the CPU 41 proceeds to step S122. In contrast, if the CPU 41 did not receive an output instruction via the management apparatus 30 in the predetermined period from the same terminal 20 (NO in step 120), the CPU 41 proceeds to step S136.

In step S122, the CPU 41 determines whether the use period received from the terminal 20 in step S110 is longer than or equal to a predetermined first period (for example, three months). If the use period is longer than or equal to the predetermined first period (YES in step 122), the CPU 41 proceeds to step S138. In contrast, if the use period is shorter than the predetermined first period (NO in step 122), the CPU 41 proceeds to step S136.

In step S136, the CPU 41 reads, from the nonvolatile memory 44, the processing-target data related to the output instruction received from the terminal 20 or the management apparatus 30, and encrypts the confidential information included in the processing-target data. Then, the CPU 41 outputs the resulting processing-target data to the terminal 20. That is, the CPU 41 adds limitation to the processing-target data, and outputs the processing-target data to the terminal 20. Examples of addition of limitation to processing-target data may include encryption of all the processing-target data, and addition of prohibition of copying and editing of the processing-target data on a terminal which receives the processing-target data.

In the first exemplary embodiment, to encrypt the confidential information, the CPU 41 extracts, from the processing-target data, all pieces of character information preset by the manager, and encrypts the extracted character information. However, the configuration is not limited to this example. For example, to encrypt the confidential information, the CPU 41 may extract, from the processing-target data, all pieces of character information included in a part preset by the manager, and may encrypt the extracted character information. Alternatively, the CPU 41 may generate processing-target data in which the extracted character information is replaced with invisible information, and may output the generated processing-target data to the terminal 20.

In step S138, the CPU 41 reads, from the nonvolatile memory 44, the processing-target data related to the output instruction received from the terminal 20 or the management apparatus 30, and outputs the processing-target data, having no limitation, to the terminal 20. The output of processing-target data having no limitation refers to output of processing-target data to the terminal 20 without being subjected to, for example, an encryption process, a process of making the confidential information invisible, or a process of making the processing-target data prohibited from being copied or modified.

In step S140, the CPU 21 of the terminal 20 prints the processing-target data received from the information processing apparatus 40, and ends the information process.

In the first exemplary embodiment, even when the CPU 41 of the information processing apparatus 40 receives an output instruction not via the management apparatus 30, if the CPU 41 has received an output instruction via the management apparatus 30 in the predetermined period and if the use period of the terminal 20 is longer than or equal to the first period, the CPU 41 outputs the processing-target data having no limitation. However, the configuration is not limited to this example. For example, if the CPU 41 has received an output instruction via the management apparatus 30 in the predetermined period, the CPU 41 may output processing-target data having no limitation, regardless of the use period of the terminal 20. Alternatively, the predetermined period and the first period may be determined for each piece of user information or each piece of terminal information. The upper limit value of the count of, or the period for, operations of outputting processing-target data having no limitation, even when the CPU 41 receives an output instruction not via the management apparatus 30 may be determined for each piece of user information or each piece of terminal information.

In the case where a user uses multiple terminals 20, if an output instruction is directly received from the user, for whom the total of all the periods of use of the terminals 20 is longer than or equal to a second period, by using a terminal 20 owned by the user, the processing-target data having no limitation may be output. Alternatively, when the CPU 41 directly receives an output instruction from a user, for whom the total of the periods is longer than or equal to a third period longer than the second period, by using a terminal 20 which is not owned by the user, the processing-target data having no limitation may be output.

Referring to FIG. 8, the path-information issuing process will be described.

In step S200 in FIG. 8, the CPU 31 of the management apparatus 30 determines whether the output instruction, the user information, and the terminal information have been received from a user, who is managed by the manager, in step S112 in the information process. Specifically, the CPU 31 determines whether the user information received in step S112 in the information process is stored in the manager database 32B. The manager database 32B may be a database in which authentication information for authenticating users in the authentication system managed by the manager is recorded. If the CPU 31 receives the output instruction, the user information, and the terminal information from a user who is managed by the manager (YES in step 200), the CPU 31 proceeds to step S204. In contrast, if the CPU 31 receives the output instruction, the user information, and the terminal information from a user who is not managed by the manager (NO in step 200), the CPU 31 proceeds to step S202.

In step S202, the CPU 31 notifies the terminal 20, which has transmitted the output instruction, the user information, and the terminal information, of a message that the processing-target data related to the output instruction is not allowed to be output. Then, the CPU 21 of the terminal 20 ends the information process.

In step S204, the CPU 31 issues path information indicating that the management apparatus 30 has received the output instruction from the terminal 20. Specifically, the CPU 31 reads, from the nonvolatile memory 34, the management apparatus information which is information for identifying the management apparatus 30 itself, and issues, as path information, information (for example, information in a string) obtained by combining the user information and the terminal information, which have been received in step S112 in the information process, with the read management apparatus information. The path information is not limited to the information described above. For example, information obtained by combining only the user information received in step S112 in the information process with the management apparatus information may be used as the path information.

In step S206, the CPU 31 stores the user information, which has been received in step S112 in the information process, in association with the issued path information.

In step S208, the CPU 31 transmits the path information, which is issued in step S204, to the terminal 20 which has transmitted the output instruction, the user information, and the terminal information.

In step S210, the CPU 21 of the terminal 20 transmits the path information, which has been received from the management apparatus 30, to the information processing apparatus 40.

In step S212, the CPU 41 of the information processing apparatus 40 asks the management apparatus 30 if the path information received from the terminal 20 in step S210 is path information issued by the management apparatus 30. Specifically, the CPU 41 transmits, to the management apparatus 30, the path information received from the terminal 20.

As the method of determining whether the path information received from the information processing apparatus 40 is path information issued by the management apparatus 30, the management apparatus 30 may determine whether a string issued and stored as path information in the management apparatus 30 matches the received path information. In issuing path information, the management apparatus 30 may issue a hash value, which is generated from the string of the path information by using a hash function, as the path information and may store the hash value. The management apparatus 30 may determine whether the stored hash value matches the hash value of the path information received from the information processing apparatus 40.

In step S214, the CPU 31 of the management apparatus 30 determines whether the path information received from the information processing apparatus 40 in step S212 is path information issued by the management apparatus 30. If the path information received from the information processing apparatus 40 is path information issued by the management apparatus 30 (YES in step 214), the CPU 31 proceeds to step S220. In contrast, if the path information received from the information processing apparatus 40 is not path information issued by the management apparatus 30 (NO in step 214), the CPU 31 proceeds to step S216.

In step S216, the CPU 31 transmits, to the information processing apparatus 40, a message that the path information received by the information processing apparatus 40 from the terminal 20 is not path information issued by the management apparatus 30. Then, the CPU 41 of the information processing apparatus 40 ends the information process.

In step S220, the CPU 31 transmits, to the information processing apparatus 40, a message that the path information received from the terminal 20 by the information processing apparatus 40 is path information issued by the management apparatus 30.

In step S222, the CPU 31 transmits, to the information processing apparatus 40, the output instruction, the user information, and the terminal information, which have been received in step S112 in the information process, and the path information, which has been received in step S212. Then, the CPU 21 of the terminal 20, the CPU 31 of the management apparatus 30, and the CPU 41 of the information processing apparatus 40 end the path-information issuing process, and proceed to step S118 in the information process.

In step S222, an apparatus which transmits the output instruction, the user information, the terminal information, and the path information to the information processing apparatus 40 may be the terminal 20, not the management apparatus 30. In this case, the CPU 21 of the terminal 20 transmits, to the information processing apparatus 40, the output instruction, the user information, and the terminal information, which have been transmitted in step S112 in the information process, and the path information, which has been received in step S208.

In the first exemplary embodiment, when the CPU 41 of the information processing apparatus 40 receives an output instruction directly from the terminal 20, the CPU 41 encrypts, for output, the confidential information included in the processing-target data. Thus, the processing-target data is output in such a manner that the confidential information is not leaked to any user other than the user who is managed by the manager. However, the configuration is not limited to this example. When the CPU 41 directly receives an output instruction from the terminal 20 not via the management apparatus 30, the CPU 41 may process, for output, the confidential information included in the processing-target data so that the confidential information is invisible, for example, by filling the confidential information with black. Alternatively, when the CPU 41 directly receives an output instruction from the terminal 20 not via the management apparatus 30, the CPU 41 may output only information other than the confidential information included in the processing-target data. Alternatively, when the CPU 41 directly receives an output instruction from the terminal 20 not via the management apparatus 30, the CPU 41 may output processing-target data to which a mark indicating prohibition of copying and editing is added.

Assume the case in which the terminal 20 is a printer having a print function. In this case, when the CPU 41 receives an output instruction via the management apparatus 30, the CPU 41 may output, to the terminal 20, the processing-target data which is allowed to be printed. When the CPU 41 receives an output instruction not via the management apparatus 30, the CPU 41 may output, to the terminal 20, the processing-target data which is not allowed to be printed, and a preview image of the processing-target data may be displayed on the display unit 26. Assume the case in which the terminal 20 is a personal computer. In this case, when the CPU 41 receives an output instruction via the management apparatus 30, the CPU 41 may output, to the terminal 20, the processing-target data which is stored in the terminal 20 with permission of copying. When the CPU 41 receives an output instruction not via the management apparatus 30, the CPU 41 may output, to the terminal 20, the processing-target data which is stored with prohibition of copying. Alternatively, when the CPU 41 receives an output instruction via the management apparatus 30, the CPU 41 may output, to the terminal 20, the processing-target data with permission of change of the processing-target data. When the CPU 41 receives an output instruction not via the management apparatus 30, the CPU 41 may output, to the terminal 20, the processing-target data with prohibition of change of the processing-target data. Alternatively, the CPU 41 may define how to limit processing-target data, for each combination of the processing-target-data attribute, user information, terminal information, and the path attribute.

Second Exemplary Embodiment

In the first exemplary embodiment, the confidential information included in processing-target data is stored in the nonvolatile memory 44 without being encrypted in advance. When the CPU 41 receives an output instruction via the management apparatus 30, the CPU 41 outputs processing-target data having confidential information which is not encrypted. When the CPU 41 receives an output instruction not via the management apparatus 30, the CPU 41 outputs processing-target data having confidential information which has been encrypted. In a second embodiment, confidential information which has been encrypted in advance is stored in the nonvolatile memory 44. Regardless of whether the CPU 41 receives an output instruction via or not via the management apparatus 30, the CPU 41 outputs processing-target data having encrypted confidential information. When the CPU 41 receives an output instruction via the management apparatus 30, the CPU 41 causes the management apparatus 30 to decrypt the encrypted confidential information. When the CPU 41 receives an output instruction not via the management apparatus 30, the CPU 41 does not cause the management apparatus 30 to decrypt the confidential information. The difference from the first exemplary embodiment will be described below. The hardware configuration of the second exemplary embodiment is the same as that of the first exemplary embodiment, and will not be described.

Figure 9:
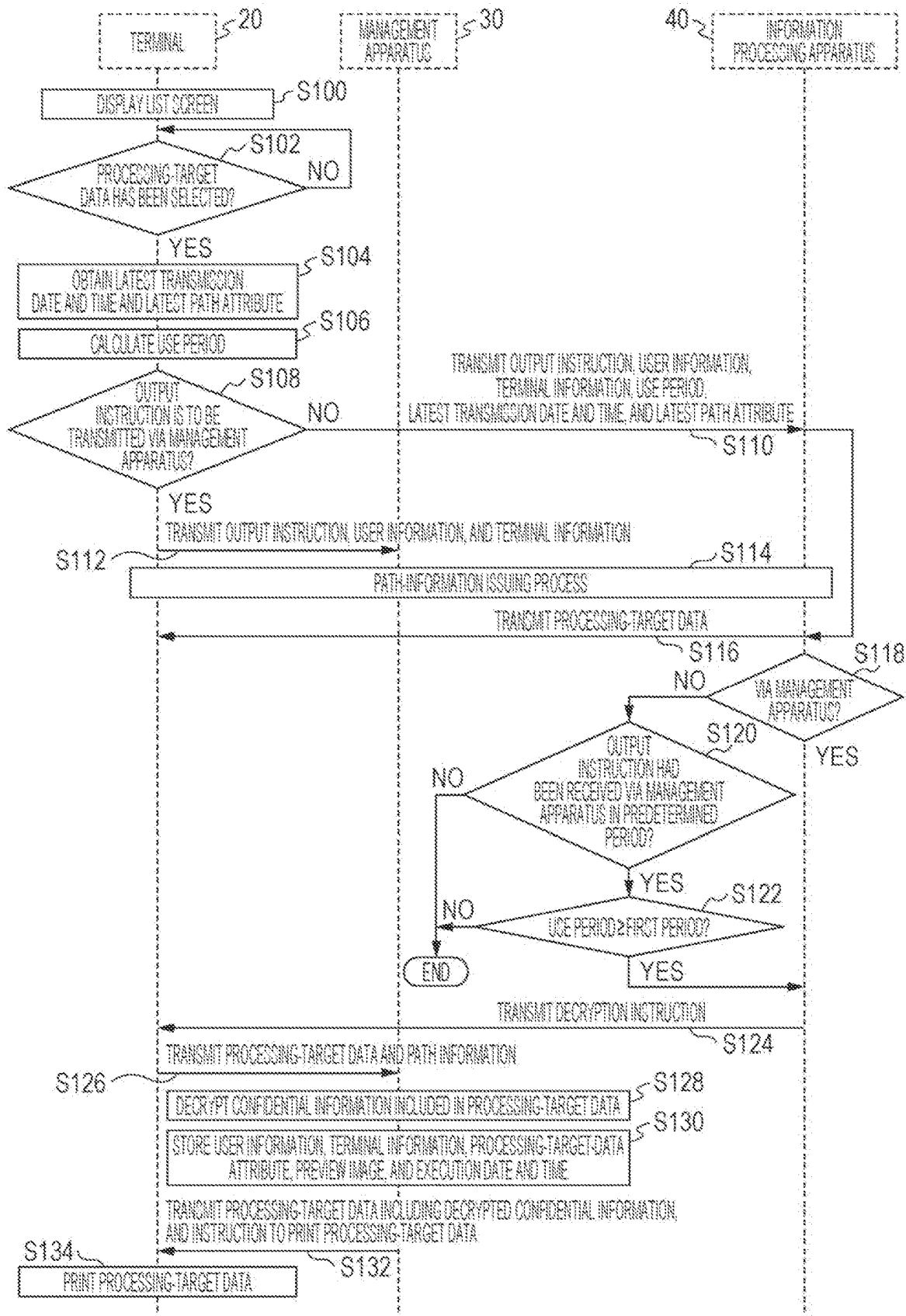
FIG. 9 is a sequence chart of an exemplary information process in an information processing system according to a second exemplary embodiment.

Referring to FIGS. 9 and 10, the flow of an information process in the information processing system 10 according to the second exemplary embodiment will be described.

The flow of the information process illustrated in FIG. 9 is different from that in the first exemplary embodiment in the following points: step S116 is performed between step S114 and step S118 which are in the information process in FIG. 6; instead of processes from step S136 to step S140, processes from step S124 to step S134 are performed. The flow of the information process in FIG. 9 is different from that in the first exemplary embodiment in that, when negative determination is made in step S120 in the information process in FIG. 6, and when negative determination is made in step S122, the information process ends.

In step S116 in FIG. 9, the CPU 41 of the information processing apparatus 40 reads, from the nonvolatile memory 44, the processing-target data related to the output instruction received from the terminal 20 or the management apparatus 30, and transmits, to the terminal 20, the processing-target data with the encrypted confidential information which is included in the processing-target data and which has not been decrypted.

In step S124, the CPU 41 transmits, to the terminal 20, a decryption instruction which is an instruction to decrypt the encrypted confidential information included in the processing-target data transmitted to the terminal 20 in step S116.

In step S126, the CPU 21 of the terminal 20 transmits, to the management apparatus 30, the processing-target data received in step S116 and the path information received from the management apparatus 30 in the path-information issuing process.

In step S128, the CPU 31 of the management apparatus 30 decrypts the confidential information included in the processing-target data received in step S126, by using decryption information issued to decrypt the processing-target data in the path-information issuing process.

In step S130, the CPU 31 stores the user information and the terminal information which have been received from the terminal 20, the processing-target-data attribute of the processing-target data received in step S126, the preview image of the processing-target data, and the execution date and time of step S130, in association with each other.

In step S132, when the terminal 20 is a printer having a print function, the CPU 31 transmits, to the terminal 20, the processing-target data including the confidential information which has been decrypted in step S128, and an instruction to print the processing-target data. Specifically, the CPU 31 transmits, to the printer of the terminal 20, an instruction to print the processing-target data, for example, by using a protocol of internet printing protocol (IPP), or the Simple Object Access Protocol (SOAP) or representational state transfer application programming interface (REST API) which is provided by the terminal 20.

In step S134, the CPU 21 of the terminal 20 prints the processing-target data received from the management apparatus 30, and ends the information process.

Referring to FIG. 10, the path-information issuing process will be described.

The flow of the path-information issuing process in FIG. 10 is different from that of the first exemplary embodiment in that step S218 is performed between step S216 and step S220 which are in the path-information issuing process in FIG. 8.

In step S218 in FIG. 10, the CPU 31 of the management apparatus 30 issues the decryption information for decrypting the processing-target data, and stores the decryption information in association with the path information issued in step S204.

The exemplary embodiments are described above. The technical scope of the present disclosure is not limited to the scope described in the exemplary embodiments. Various changes and improvements may be added to the exemplary embodiments without departing from the gist of the present disclosure. An embodiment to which the various changes and improvements are added is encompassed in the technical scope of the present disclosure.

The exemplary embodiments do not limit the claims in the disclosure. Not all combinations of features described in the exemplary embodiments are necessary for the units for addressing the issue in the present disclosure. The exemplary embodiments include various stages of the disclosure. Through combinations of disclosed components, various disclosures are extracted. Even if some components are removed from all the components described in the exemplary embodiments, a configuration in which these components are removed may be extracted as a disclosure as long as such a configuration has an effect.

For example, in the exemplary embodiments, when the CPU 41 of the information processing apparatus 40 receives an output instruction via the management apparatus 30, the CPU 41 outputs the processing-target data having no limitation. However, the configuration is not limited to this example. For example, when the terminal 20 has not been authenticated by an apparatus other than the terminal 20 and the management apparatus 30 before the terminal 20 transmits processing-target data to the management apparatus 30, the CPU 41 may output processing-target data having limitation. When the CPU 41 does not directly receive an output instruction from the management apparatus 30, the CPU 41 may output processing-target data having limitation.

Even when the CPU 41 of the information processing apparatus 40 receives an output instruction not via the management apparatus 30, if the CPU 41 receives the output instruction from the terminal 20 via a communication unit managed by the manager, such as the Virtual Private Network (VPN), the CPU 41 may output processing-target data having no limitation.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the form in which programs are installed in a ROM is described. However, the configuration is not limited to this. The programs according to the exemplary embodiments may be provided by storing the programs in a computer-readable storage medium. For example, the programs according to the exemplary embodiments may be provided by recording the programs in optical disks, such as a compact disc (CD)-ROM and a digital versatile disc (DVD)-ROM, or by recording the programs in semiconductor memories, such as a Universal Serial Bus (USB) memory and a memory card. Alternatively, the programs according to the exemplary embodiments may be obtained from an external apparatus through a communication I/F.

In the exemplary embodiments, the case in which the processes in the information processing system 10 are implemented by using a computer through a software configuration by running programs is described. However, the disclosure is not limited to this. For example, the processes in the information processing system 10 may be implemented through a hardware configuration or a combination of hardware configuration and software configuration.

Additionally, the configurations of the terminal 20, the management apparatus 30, and the information processing apparatus 40, which are described in the exemplary embodiments, are exemplary. Needless to say, unnecessary parts may be removed, and new parts may be added without departing from the gist of the present disclosure.

The flows of the processes in the information processing system 10 described in the exemplary embodiments (see FIGS. 6, 8, 9, and 10) are also exemplary. Needless to say, unnecessary steps may be deleted, new steps may be added, and the processing order may be swapped without departing from the gist of the present disclosure.

The following appendix for the exemplary embodiments is further disclosed.

(((1)))

An information processing apparatus comprising:
   a processor configured to:
      receive, from a terminal, an instruction to output processing-target data to the terminal, the terminal being not managed by a manager who manages an authentication system to which the information processing apparatus belongs; and
      in response to reception of the instruction via a management apparatus managed by the manager, output the processing-target data having no limitation, and, in response to reception of the instruction not via the management apparatus, output the processing-target data having limitation.

(((2)))

The information processing apparatus according to (((1))),
   wherein the processing-target data includes confidential information, and
   wherein the processor is configured to:
      in response to reception of the instruction via the management apparatus, output the processing-target data including the confidential information having no limitation, and, in response to reception of the instruction not via the management apparatus, output the processing-target data in such a manner that the confidential information is not leaked to any user other than a user who is managed by the manager.

(((3)))

The information processing apparatus according to (((2))),
   wherein the processor is configured to:
      in response to reception of the instruction via the management apparatus, output the processing-target data including the confidential information having not been encrypted, and, in response to reception of the instruction not via the management apparatus, output the processing-target data including the confidential information having been encrypted.

(((4)))

The information processing apparatus according to (((2))),
   wherein the confidential information is information which has been encrypted in advance, and
   wherein the processor is configured to:
      in response to reception of the instruction via the management apparatus, cause the management apparatus to decrypt the confidential information, and, in response to reception of the instruction not via the management apparatus, cause the management apparatus not to decrypt the confidential information.

(((5)))

The information processing apparatus according to any one of (((1))) to (((4))),
   wherein the processor is configured to:
      even in response to reception of the instruction not via the management apparatus, if such an instruction has been already received via the management apparatus, output the processing-target data having no limitation.

(((6)))

The information processing apparatus according to (((5))),
   wherein the processor is configured to:
      even in response to reception of the instruction not via the management apparatus, if such an instruction has been already received via the management apparatus in a predetermined period, output the processing-target data having no limitation.

(((7)))

The information processing apparatus according to (((5))) or (((6))),
   wherein the processor is configured to:
      even in response to reception of the instruction not via the management apparatus, if a use period of the terminal which has transmitted the instruction is longer than or equal to a first period and if such an instruction has been already received via the management apparatus, output the processing-target data having no limitation.

(((8)))

An information processing system comprising:
   the information processing apparatus according to any one of (((1))) to (((7)));
   the terminal; and
   the management apparatus,
   wherein the terminal transmits the instruction to the management apparatus or the information processing apparatus,
   wherein the management apparatus transmits, to the information processing apparatus, the instruction received from the terminal, and
   wherein, in response to reception of the instruction via the management apparatus, the information processing apparatus outputs the processing-target data having no limitation, the processing-target data being associated with the instruction, and, in response to reception of the instruction not via the management apparatus, the information processing apparatus outputs the processing-target data having limitation.

What is claimed is:

1. An information processing apparatus comprising:
a processor configured to:
   receive, from a terminal, an instruction to output processing-target data to the terminal;
   determine whether the instruction was received via a management apparatus managed by a manager that manages an authentication system to which the information processing apparatus belongs, or via an apparatus other than the management apparatus; and
   output the processing-target data with no limitation in response to a determination that the instruction was received by the management apparatus from the terminal, and, unless an overriding condition is satisfied, output the processing-target data with limitation in response to a determination that the instruction from the terminal was received via the apparatus other than the management apparatus, wherein the limitation is one or more of encryption of all the processing-target data and addition of prohibition of copying and editing of the processing-target data on a terminal that receives the processing-target data,
   wherein the terminal is not managed by the manager.

2. The information processing apparatus according to claim 1,
wherein the processing-target data includes confidential information, and
wherein the processor is configured to:
   in response to reception of the instruction via the management apparatus, output the processing-target data including the confidential information having no limitation, and, in response to reception of the instruction not via the management apparatus, output the processing-target data in such a manner that the confidential information is not leaked to any user other than a user who is managed by the manager.

3. The information processing apparatus according to claim 2,
wherein the processor is configured to:
   in response to reception of the instruction via the management apparatus, output the processing-target data including the confidential information having not been encrypted, and, in response to reception of the instruction not via the management apparatus, output the processing-target data including the confidential information having been encrypted.

4. The information processing apparatus according to claim 2,
wherein the confidential information is information which has been encrypted in advance, and
wherein the processor is configured to:
   in response to reception of the instruction via the management apparatus, cause the management apparatus to decrypt the confidential information, and, in response to reception of the instruction not via the management apparatus, cause the management apparatus not to decrypt the confidential information.

5. The information processing apparatus according to claim 1,
wherein the processor is configured to:
   even in response to reception of the instruction not via the management apparatus, if the overriding condition that the instruction has been already received via the management apparatus exists, output the processing-target data having no limitation.

6. The information processing apparatus according to claim 1,
wherein the processor is configured to:
   even in response to reception of the instruction not via the management apparatus, if the overriding condition that that the instruction has been already received via the management apparatus in a predetermined period exists, output the processing-target data having no limitation.

7. The information processing apparatus according to claim 1,
wherein the processor is configured to:
   even in response to reception of the instruction not via the management apparatus, if the overriding condition that a use period of the terminal which has transmitted the instruction is longer than or equal to a first period and if such an instruction has been already received via the management apparatus exists, output the processing-target data having no limitation.

8. An information processing system comprising:
the information processing apparatus according to claim 1;
the terminal; and
the management apparatus,
wherein the terminal is configured to transmit the instruction to the management apparatus or the information processing apparatus,
wherein the management apparatus is configured to transmit, to the information processing apparatus, the instruction received from the terminal.

9. A non-transitory computer readable medium storing a program causing a computer to execute a process for information processing, the process comprising:
receiving, from a terminal, an instruction to output processing-target data to the terminal;
determining whether the instruction was received via a management apparatus managed by a manager that manages an authentication system to which the information processing apparatus belongs, or via an apparatus other than the management apparatus; and
outputting the processing-target data with no limitation in response to a determination that the instruction was received by the management apparatus from the terminal, and, unless an overriding condition is satisfied, outputting the processing-target data with limitation in response to a determination that the instruction from the terminal was received via the apparatus other than the management apparatus, wherein the limitation is one or more of encryption of all the processing-target data and addition of prohibition of copying and editing of the processing-target data on a terminal that receives the processing-target data,
wherein the terminal is not managed by the manager.

10. An information processing method comprising:
receiving, from a terminal, an instruction to output processing-target data to the terminal,
determining whether the instruction was received via a management apparatus managed by a manager that manages an authentication system to which the information processing apparatus belongs, or via an apparatus other than the management apparatus; and
outputting the processing-target data with no limitation in response to a determination that the instruction was received by the management apparatus from the terminal, and, unless an overriding condition is satisfied, outputting the processing-target data with limitation in response to a determination that the instruction from the terminal was received via the apparatus other than the management apparatus, wherein the limitation is one or more of encryption of all the processing-target data and addition of prohibition of copying and editing of the processing-target data on a terminal that receives the processing-target data,
wherein the terminal is not managed by the manager.

* * * * *